(12) United States Patent
Scholz

(10) Patent No.: US 9,102,229 B2
(45) Date of Patent: Aug. 11, 2015

(54) OIL FILLER NECK FOR A CYLINDER HEAD COVER

(71) Applicant: GM GLOBAL TECHNOLOGY OPERATIONS LLC, Detroit, MI (US)

(72) Inventor: Peter Scholz, Mainz-Kastel (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 68 days.

(21) Appl. No.: 13/949,382

(22) Filed: Jul. 24, 2013

(65) Prior Publication Data

US 2015/0028031 A1  Jan. 29, 2015

(51) Int. Cl.
*B65B 3/00* (2006.01)
*B65D 47/02* (2006.01)
*B67C 3/00* (2006.01)
*B60K 15/04* (2006.01)

(52) U.S. Cl.
CPC .................. *B60K 15/0406* (2013.01)

(58) Field of Classification Search
CPC ........... F01M 2011/0491; F01M 11/04; B67C 2011/027
USPC ...... 123/198 E, 188.9, 195 C; 220/86.2, 86.1, 220/293; 141/391, 392
See application file for complete search history.

(56) References Cited

U.S. PATENT DOCUMENTS

| | | | |
|---|---|---|---|
| 967,895 A | 8/1910 | Frederick | |
| 3,478,922 A * | 11/1969 | Mole | 220/86.2 |
| 4,114,779 A * | 9/1978 | Stoll, III | 220/288 |
| 4,573,605 A * | 3/1986 | Udell | 220/304 |
| 5,271,438 A * | 12/1993 | Griffin et al. | 141/59 |
| 5,960,839 A * | 10/1999 | Armesto et al. | 141/304 |
| 6,585,128 B2 * | 7/2003 | Clevenger et al. | 220/303 |
| 6,691,750 B1 * | 2/2004 | Foltz | 141/350 |
| 6,755,057 B2 * | 6/2004 | Foltz | 70/159 |
| 6,837,283 B1 | 1/2005 | Wegner | |
| 6,923,224 B1 * | 8/2005 | McClung et al. | 141/350 |
| 6,945,290 B1 * | 9/2005 | Benjey et al. | 141/302 |
| 6,968,874 B1 * | 11/2005 | Gabbey et al. | 141/349 |
| 6,983,773 B1 * | 1/2006 | Hagano et al. | 141/350 |
| 7,640,954 B2 * | 1/2010 | Bar | 141/350 |
| 7,726,363 B2 * | 6/2010 | Benjey et al. | 141/302 |
| 7,997,307 B2 * | 8/2011 | Benjey | 141/350 |
| 8,220,506 B2 * | 7/2012 | Aso | 141/305 |

(Continued)

FOREIGN PATENT DOCUMENTS

| | | | |
|---|---|---|---|
| DE | 2845381 A1 | 4/1980 | |
| DE | 19751191 A1 | 5/1999 | |

(Continued)

OTHER PUBLICATIONS

German Patent Office, German Search Report for Application No. 102013010736.9, dated Oct. 18, 2013.

*Primary Examiner* — Marguerite McMahon
*Assistant Examiner* — Tea Holbrook
(74) *Attorney, Agent, or Firm* — Ingrassia Fisher & Lorenz PC

(57) ABSTRACT

An oil filler neck is provided for a cylinder head cover that exhibits an oil fill opening with an oil droplet and oil mist protection device. The oil droplet and oil mist protection device has a lower partial area, an upper partial area and elastomer tongues. The elastomer tongues are arranged one over the other and spaced apart from each other in the upper partial area and lower partial area.

20 Claims, 10 Drawing Sheets

(56) References Cited

U.S. PATENT DOCUMENTS

| | | | |
|---|---|---|---|
| 8,555,937 B2* | 10/2013 | Murabayashi et al. | 141/350 |
| 8,714,213 B2* | 5/2014 | Girgenrath | 141/350 |
| 2009/0266835 A1* | 10/2009 | Zentner | 220/810 |
| 2011/0100985 A1* | 5/2011 | Tsiberidis | 220/86.2 |
| 2013/0306631 A1* | 11/2013 | Scholz et al. | 220/86.2 |

FOREIGN PATENT DOCUMENTS

| | | |
|---|---|---|
| DE | 2005120965 A | 5/2005 |
| DE | 102008004084 A1 | 7/2009 |
| KR | 1020050037738 A | 4/2005 |

* cited by examiner

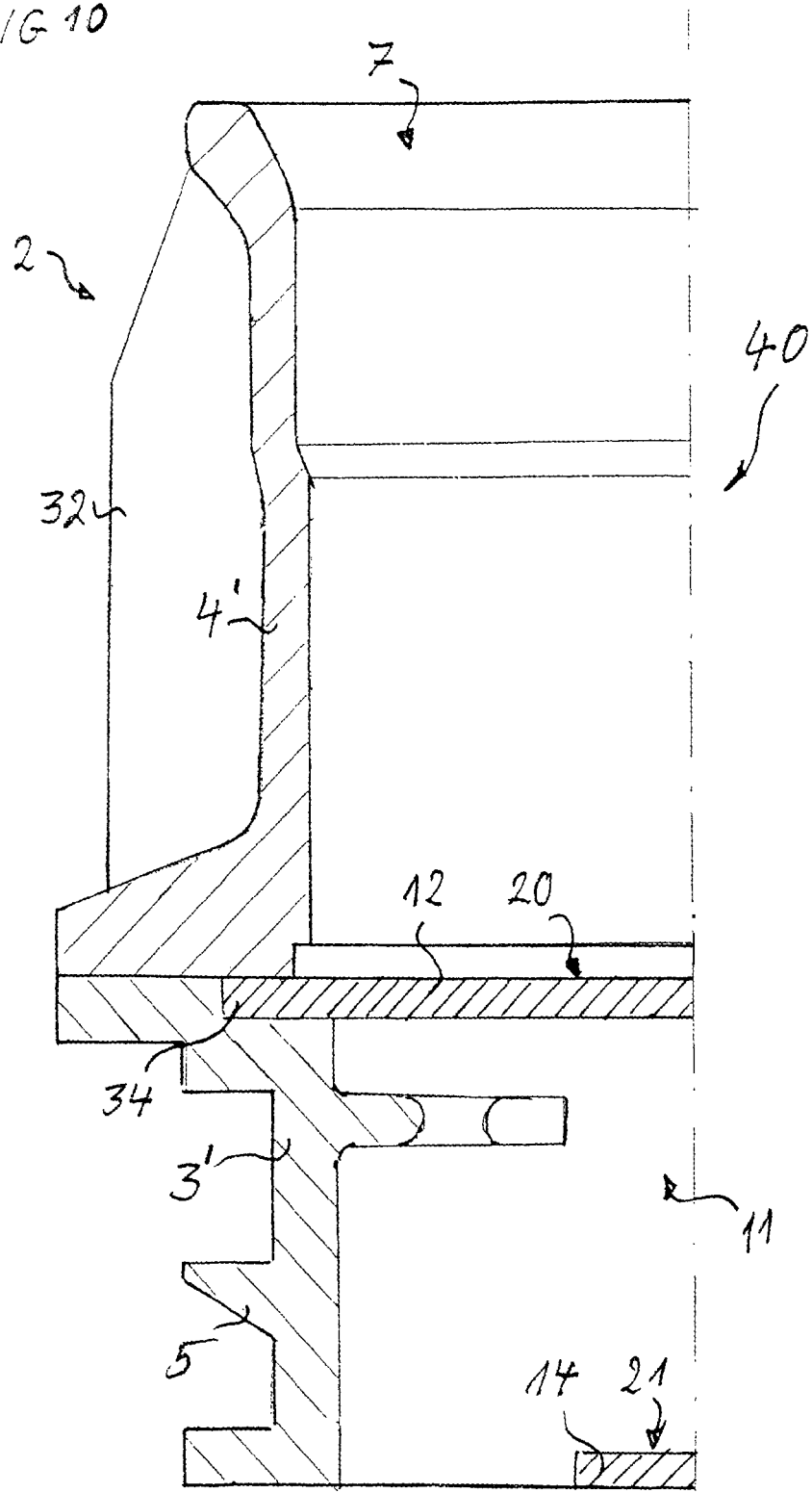

OIL FILLER NECK FOR A CYLINDER HEAD COVER

TECHNICAL FIELD

The technical field relates to oil filler neck for a cylinder head cover, in particular a cylinder head cover of a vehicle.

BACKGROUND

Known from Publication DE 10 2008 004 084 A1 is a seal mounting fixture as well as a seal mounting fixture for a fill port, in particular for an oil fill port in a vehicle. The known seal mounting fixture is intended to prevent a faulty operation of the seal mounting fixture, in particular a loose sealing cap that has gone unnoticed. Provided to this end is an activation lockout, which prevents the sealing cap from performing a locking motion when the sealing cap is not located in its starting locked position. On the other hand, oil droplets or oil mist form in conventional oil fill ports while filling oil, which are carried away with the volume of air exiting the oil fill port, and released into the environment from the oil fill port.

At least one object is to provide an oil filler neck for a cylinder head cover of a vehicle, with which a leakage of oil droplets or oil mist is diminished while filling or refilling oil with the removed oil filler sealing cap. Accordingly, other objects, desirable features and characteristics will become apparent from the subsequent summary and detailed description, and the appended claims, taken in conjunction with the accompanying drawings and this background.

SUMMARY

An oil filler neck is provided for a cylinder head cover of a vehicle having an oil fill port with an oil droplet and oil mist protection device. The oil droplet and oil mist protection device has a lower partial area, an upper partial area and elastomer tongues. The elastomer tongues are arranged in the upper partial area and lower partial area, and situated one over the other and spaced apart from each other.

One advantage to the oil filler neck is that the configuration of elastomer tongues one over the other and spaced apart from each other yields a further improved oil droplet and oil mist protection device. These tongues divided into two planes diminish the leakage of oil droplets or oil mist more effectively than before while filling or topping off the oil via the fill port, especially since a volume of air exits the engine compartment in the opposite direction in the filling process. The volume of air flowing out corresponds to the volume of oil to be filled, and this volume of air can entrain oil droplets and oil mist and release them into the environment. The additional tongues of the oil droplet and oil mist protection device now act as a safeguard against this.

In an exemplary embodiment, the elastomer tongues in the upper partial area and elastomer tongues in the lower area overlap each other in such a way that an upper oil passage opening and lower oil passage opening become offset relative to each other. This additionally prevents oil droplets and oil mist from exiting and being released into the environment. For example, the elastomer tongues flexibly adjust to a filling tube so as to protect against oil droplets and oil mist while this filling tube of an oil fill tap is being inserted, so that any oil droplets or oil mist entrained with the exiting volume of air are separated out of the exiting stream of air on the interior side of the elastomer tongues directed toward the engine compartment.

The elastomer tongues of the oil droplet or oil mist protection device are arranged in two planes one above the other and spaced apart by distance a relative to each other, which largely corresponds to the axial length l of the lower partial area. This distance a between the two planes of the elastomer tongues simultaneously forms a high passage opening when the oil to be topped off is poured into the oil fill port from an oil container instead of an oil fill tap.

The elastomer tongues here form upper elastomer tongues in an upper plane, and lower elastomer tongues in a lower plane. The upper elastomer tongues here form an upper top surface smaller than a cross sectional surface of the oil fill opening, so that the upper top surface leaves open an upper oil passage opening. In like manner, the lower elastomer tongues form a smaller lower top surface that is smaller than the cross sectional surface of the oil fill opening, so that the lower top surface leaves open a lower oil passage opening for inflowing oil.

In order to also ensure that any release of oil droplets or oil mist into the environment is prevented as oil enters from an oil container, it is provided that the upper top surface and lower top surface overlap each other, and that the upper oil passage opening and lower oil passage opening are then offset relative to each other. As a consequence, the volume of air flowing out must pass through a virtual labyrinth seal, during which the oil droplets and oil mist become deposited on the lower sides of the overlapping elastomer tongues.

In order to prevent oil from accumulating in the oil filler neck as oil enters into the engine compartment, the upper and lower elastomer tongues leave open an oil passage cross section that corresponds to a maximum clearance between the upper and lower plane of elastomer tongues, specifically a×d, where a is equal to the distance between the upper and lower plane, and d is equal to the inner diameter of the lower partial area. This oil passage cross section is also correspondingly kept away from the cover effect of the tongues with a circular segment that remains free of elastomer tongues in the area of the upper elastomer tongues and lower elastomer tongues.

In another embodiment, the upper elastomer tongues can be formed by an upper elastomer membrane cut through at least once, which covers more than half the cross sectional surface of the oil fill opening. Accordingly, the lower elastomer tongues can be formed by a lower elastomer membrane cut through at least once, which covers more than half the cross sectional surface of the oil fill opening, wherein the top surfaces of the upper and lower membrane overlap each other. As a consequence, the upper membrane cut through at least once forms at least two upper elastomer tongues, and the lower membrane cut through at least once forms two lower elastomer tongues.

Further provided is an internal combustion engine, which comprises the driving aggregate of the vehicle, and exhibits an oil filler neck according to one of the preceding embodiments. The oil filler neck is integrated into a cylinder head cover of the internal combustion engine.

Another embodiment provides an oil filler neck in the form of a separate extension adapter. As a result, the oil filler neck can be retrofitted on a cylinder cover to better prevent oil from leaking out. This design can further enable ease of use due to the extension. The extension adapter exhibits a lower part and upper part, wherein the lower part of the extension adapter has an oil droplet and oil mist protection device. The lower part has an outer cap guide, in particular a bayonet cap guide. During use, the latter interacts with an inner cap guide, in particular a bayonet cap guide, or is tailored to an inner cap guide of an oil fill opening. The upper part exhibits an inner screw projection for interacting with an outer screw region of an oil filler sealing cap.

On the one hand, the advantage to such an oil filler neck is that it puts the oil fill opening in a plane where an oil filler sealing cap can be conveniently and reliably manipulated. Since the upper part of the extension adapter provides an inner screw projection, an oil filler sealing cap can be attached with a one quarter or half turn, with which an outer screw region on the oil filler sealing cap can be made to engage with the inner screw projection of the upper part. To prevent the lower bayonet cap of the lower part from detaching from the oil fill opening during this turning motion, the lower part is simultaneously latched with the cylinder cover in an edge region of the oil fill opening when being secured in the bayonet cap of the fill opening.

Such an extension adapter with the oil droplet and oil mist protection device in the lower partial area with the upper and lower elastomer tongues can be fabricated as a one-piece injection molded part comprised of two material components. The two material components for the one-piece injection molding material form a hard elastomer of the lower part and a soft elastomer of the elastomer tongues.

Instead of such a one-piece oil droplet and oil mist protection device, such a protective device can also be assembled as provided in another embodiment, in which outer edges of the upper elastomer membrane or upper elastomer tongues are fixed between the upper part and lower part of the extension adapter. The outer edges of the lower elastomer membrane or lower elastomer tongues can be correspondingly fixed between the lower part and an edge region of the oil fill opening. The advantage to this is that the lower part for fixing the oil droplet and oil mist protection device and elastomer membranes or elastomer tongues for depositing the oil droplets or oil mist can be independently provided with materials that have been better tailored to the various functions.

Further provided is that an internal combustion engine comprising the driving aggregate of the vehicle exhibit such an oil filler neck in a cylinder head cover according to one of the above embodiments. The oil filler neck can be integrated into the cylinder head cover. It is further provided that a motor vehicle is equipped with an internal combustion engine that has such an oil filler neck.

BRIEF DESCRIPTION OF THE DRAWINGS

The present invention will hereinafter be described in conjunction with the following drawing figures, wherein like numerals denote like elements, and:

FIG. 10 shows a diagrammatic cross section through an extension adapter of an oil filler neck according to a third embodiment.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
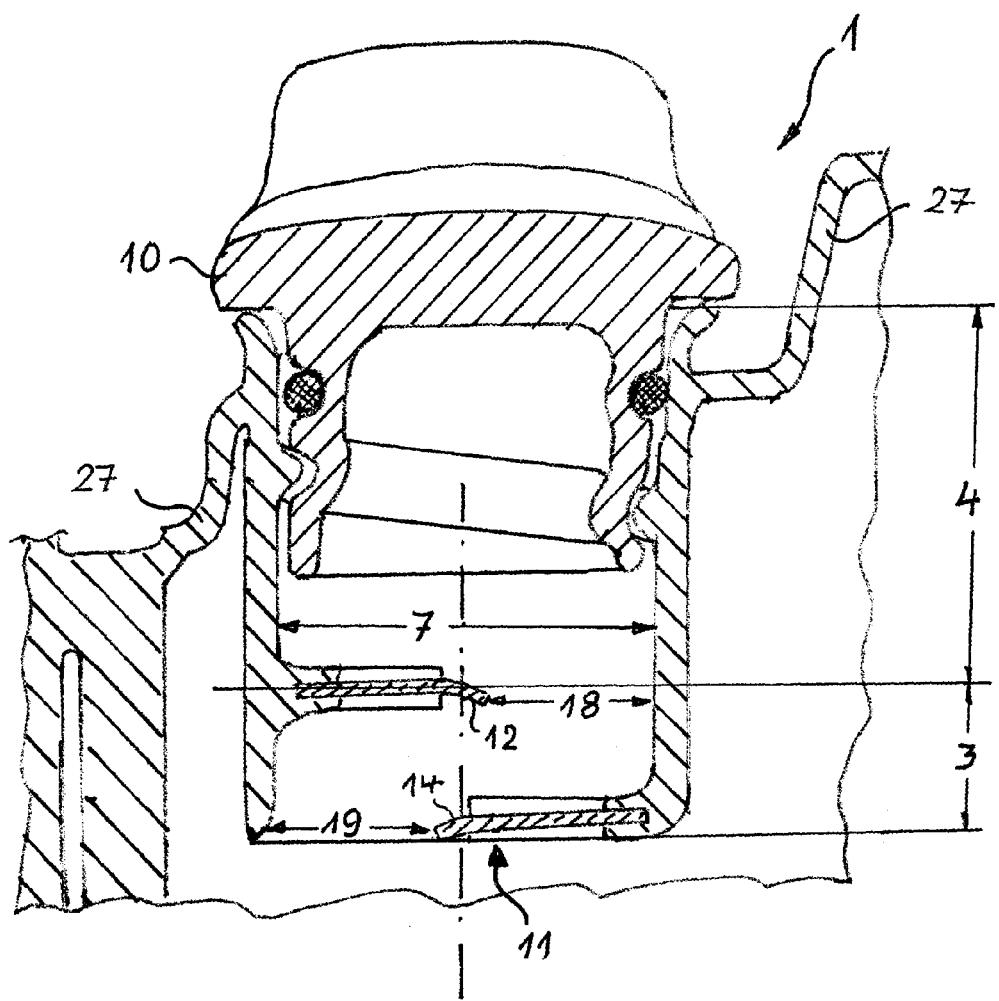
FIG. 1 shows a diagrammatic view through an oil filler neck of a cylinder head cover according to a first embodiment.

FIG. 1 shows a diagrammatic cross section through an oil filler neck 1 for a cylinder head cover 27 according to a first embodiment of the invention. The oil filler neck 1 exhibits an oil fill opening 7, which can be covered by an oil filler sealing cap 10 as depicted on FIG. 1. The oil fill opening 7 incorporates an oil droplet and oil mist protection device 11 spaced apart from the oil filler sealing cap 10. The oil droplet and oil mist protection device 11 exhibits a lower partial area 3 and upper partial area 4. The partial areas 3 and 4 each have elastomer tongues 12 and 14, wherein the elastomer tongues 12 of the upper and 14 of the lower partial area 4 or 3 are arranged over each other and spaced apart from each other, and diminish an inner diameter of the oil fill opening 7 in the lower partial area 3 and in the upper partial area 4. The elastomer tongues 12 in the upper partial area 4 and elastomer tongues 14 in the lower partial area 3 overlap in such a way that an upper oil passage opening 18 and lower oil passage opening 19 become offset relative to each other. In this embodiment, the oil filler neck 1 and in particular the oil droplet and oil mist protection device 11 is integrated into the cylinder head cover 27.

Figure 2:
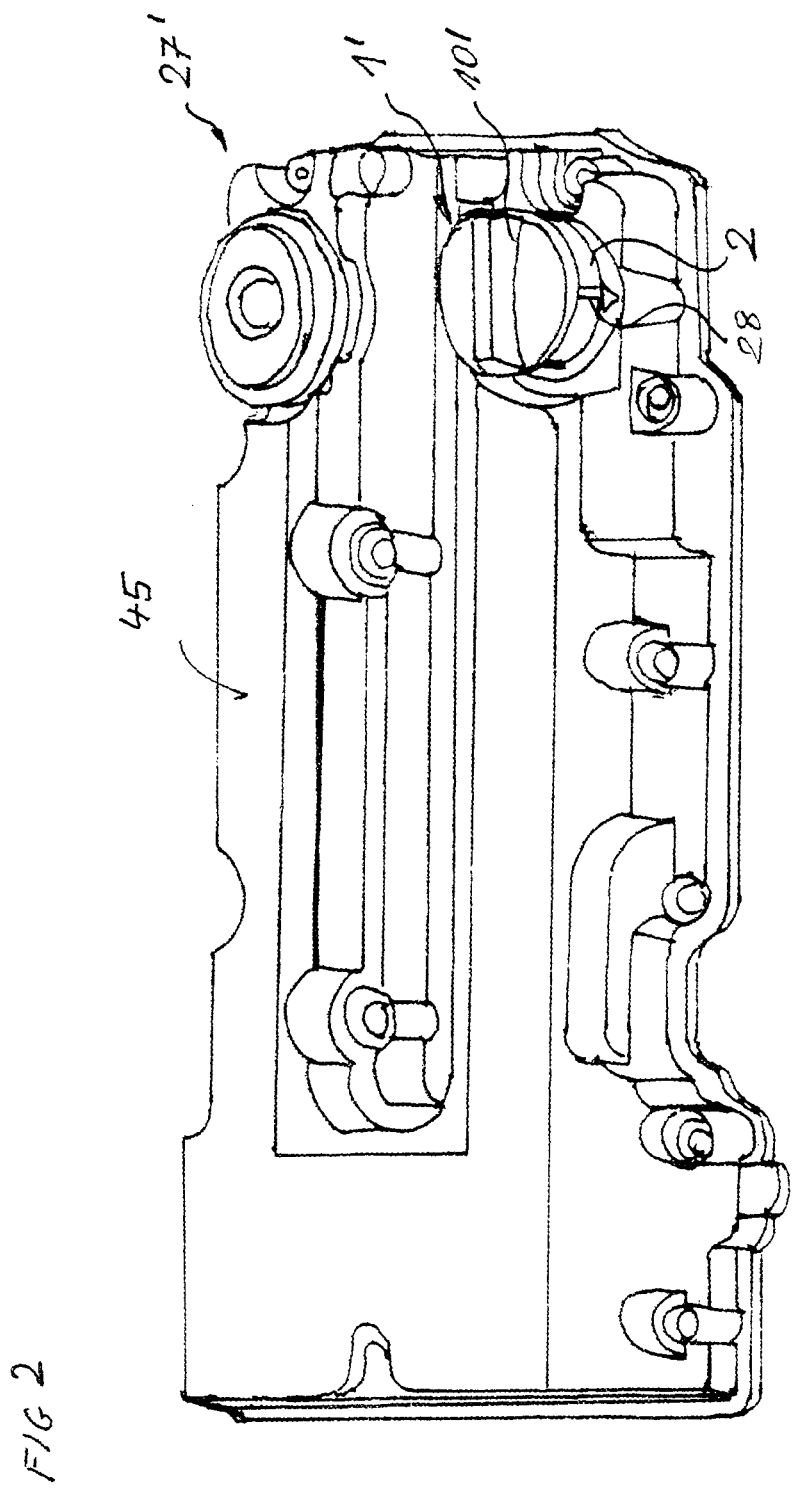
FIG. 2 shows a diagrammatic, perspective view of a cylinder head cover of a motor vehicle engine with oil filler neck according to a second embodiment.

FIG. 2 shows a diagrammatic, perspective view of a cylinder head cover 27', which is made out of plastic, and situated on a cylinder head of an internal combustion engine. This cylinder head cover 27' exhibits an oil filler neck 1' according to a first embodiment of the invention. This oil filler neck 1' is made to project out of a surface 45 of the cylinder head cover 27' with an extension adapter 2. This extension adapter 2 is sealed by an oil filler sealing cap 10, which engages a screw projection inside the extension adapter 2, and thus can be securely fixed in place on the extension adapter by a simple quarter or half turn. The extension adapter itself is joined in a media-tight manner and additionally latched with the cylinder head cover 27' with a bayonet cap. A latching arrow 28 shows a production technician when the extension adapter 2 has been latched in its final position with the cylinder head cover 27'.

Figure 3:
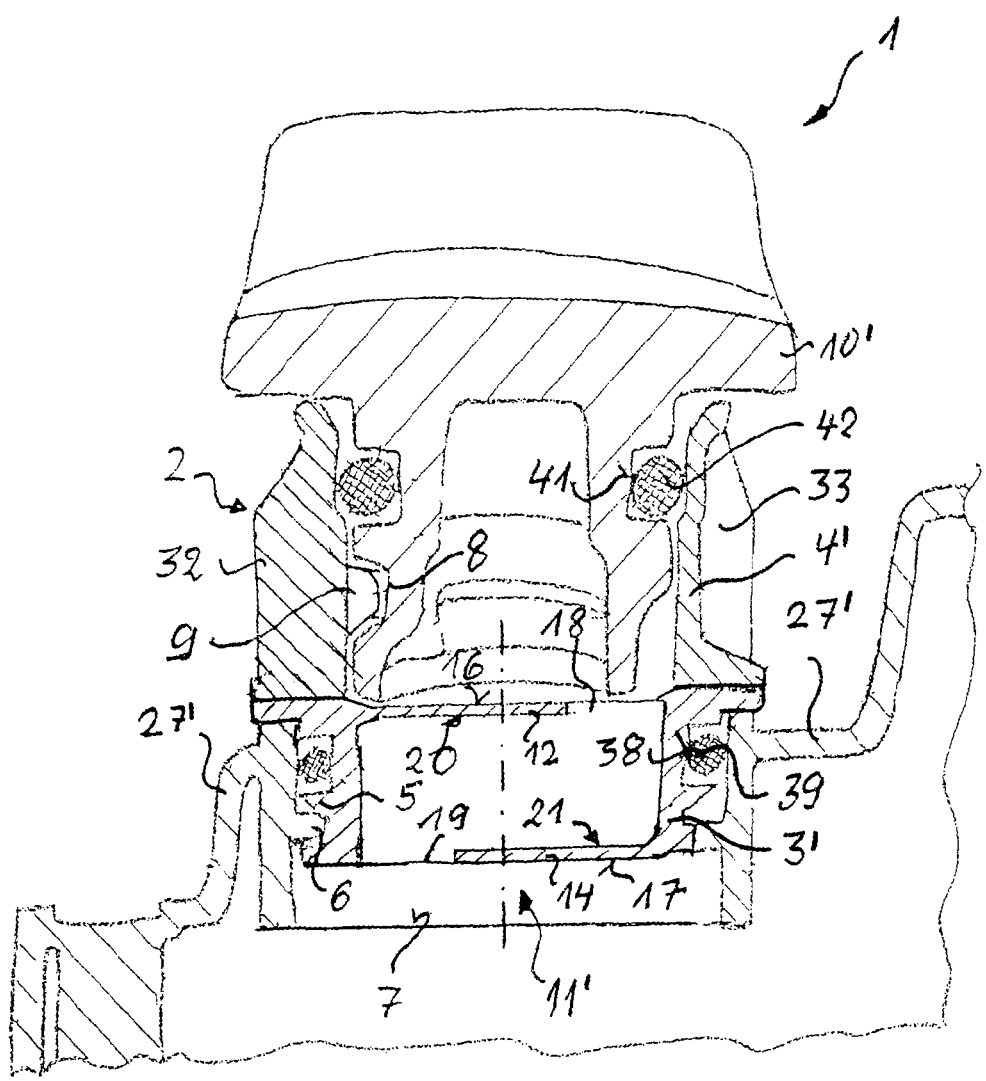
FIG. 3 shows a diagrammatic cross section through the oil filler neck according to FIG. 2.

FIG. 3 shows a diagrammatic cross section through the oil filler neck 1' according to FIG. 2. The oil filler neck 1' exhibits an extension adapter 2, which itself consists of two parts, specifically an upper part 4' and a lower part 3', which are materially bonded with each other. While the upper part 4' can accommodate the oil filler sealing cover 10', an oil droplet and oil mist protection device 11' is arranged in the lower part 3'. In this embodiment of the invention, the oil droplet and oil mist protection device 11' essentially has an upper plane 16, in which are arranged elastomer tongues 12 of an upper membrane 20 that does not completely seal a fill opening 7, so that the upper membrane 20 leaves open an oil passage opening 18. The upper membrane 20 with its elastomer tongues 12 covers more than half the cross sectional surface of the oil fill opening 7.

Another elastomer membrane 21 with its elastomer tongues 14 is situated at the lower end of the lower part 3' of the extension adapter 2, and also covers more than half the cross sectional surface of the oil fill opening 7, thus leaving open a lower passage opening 19. The upper elastomer membrane 20 with its elastomer tongues 12 and the lower membrane 21 with its elastomer tongues 14 are here arranged in such a way that the membranes 20 and 21 overlap, and the oil passage openings 18 and 19 do not lie opposite each other. This yields a labyrinth seal for a volume of air streaming out of the engine compartment at a volume equal to that of the oil filling the engine compartment. Oil droplets and oil mist are entrained in this counter-flow of air, but deposited on the lower sides of the mutually overlapping elastomer tongues 12 and 14, and thus not released into the environment, instead remaining in the engine compartment under the cylinder head cover 27'.

As shown on FIG. 3, the lower part 3' of the extension adapter 2 exhibits an outer annular groove 38, which incorporates a ring seal 39, with which the extension adapter 2 is situated in the oil fill opening 7 of the cylinder head cover 27'. To this end, the cylinder head cover 27' has an inner bayonet cap guide 6 for the extension adapter 2, in which an outer bayonet cap guide 5 of the lower part 3' engages and is latched with the cylinder head cover 27' in the area of the oil fill opening 7.

In addition, the oil filler sealing cover 10' exhibits an outer annual groove 41, which incorporates a ring seal 42, which when the oil filler sealing cover 10' is tightened, seals the latter media-tight in relation to the upper part 4'. An outer screw region 9 is provided on the oil filler sealing cover 10' for purposes of tightening via a quarter or half turn of the oil filler sealing cover 10' in the upper part 4' of the extension adapter 2. This screw region 9 interacts with an inner screw projection 8 of the upper part 4' while screwing and unscrewing the oil filler sealing cover. In order to stabilize the extension adapter 2, the upper part 4' exhibits reinforcing ribs 32 and 33. A cross section of the reinforcing rib 32 is depicted in this illustration.

Figure 4:
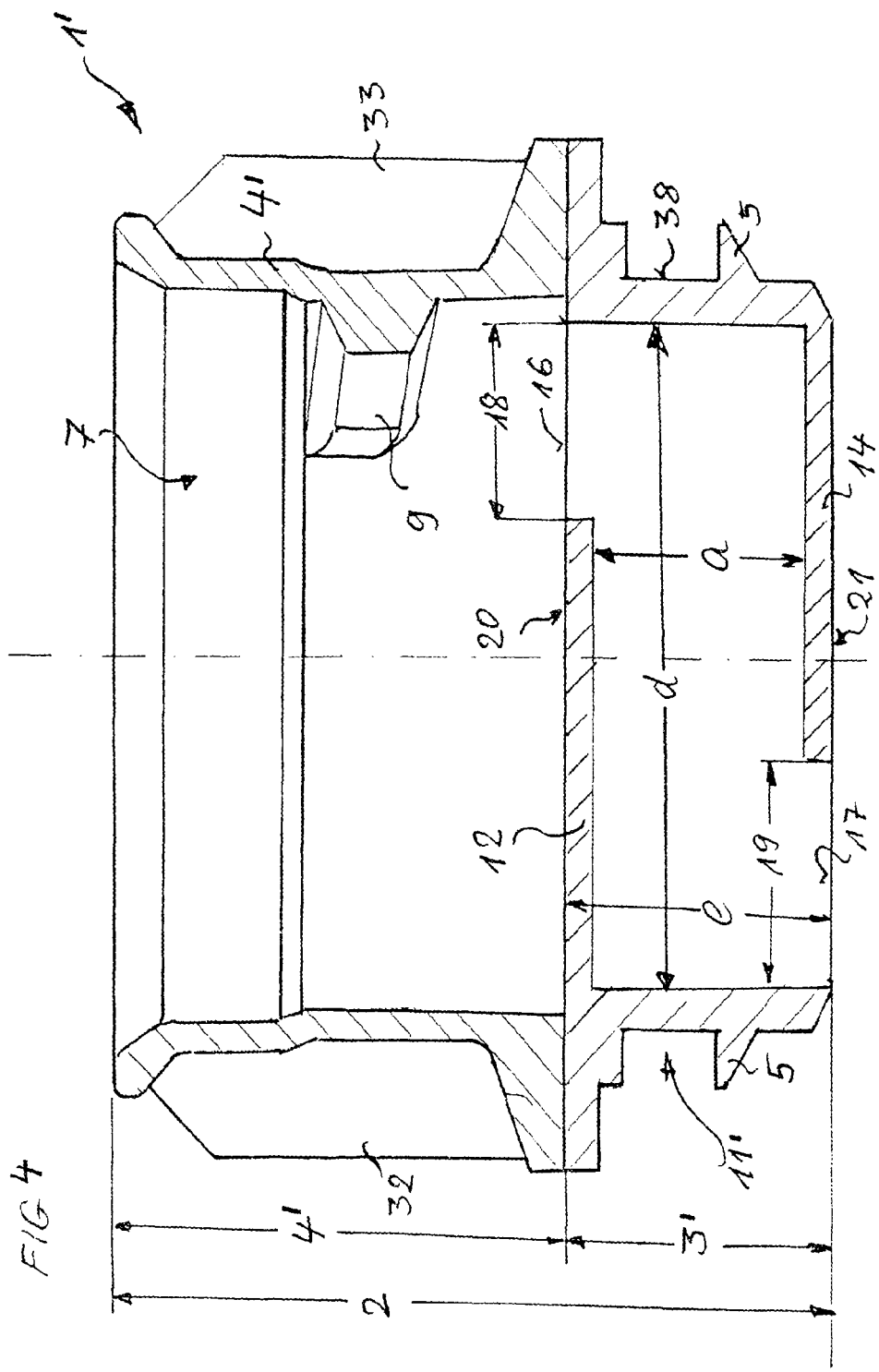
FIG. 4 shows a diagrammatic cross section through an extension adapter of the oil filler neck according to FIG. 2.

FIG. 4 shows a diagrammatic cross section through the extension adapter 2 of the oil filler neck 1 according to FIG. 2. Components with the same functions as in the preceding figures are marked with the same reference numbers, and will not be additionally explained. This cross sectional drawing of the extension adapter 2 for the oil filler neck 1' once again shows that the latter consists of two materially bonded parts, specifically a lower part 3' and an upper part 4'. The upper part 4' protrudes over the cylinder head cover 27' depicted on FIG. 2, so that an oil filler sealing cover 10' shown on FIG. 3 can be screwed into the oil fill opening 7 from above. As evident from FIG. 4, the upper part 4' to this end exhibits an inner screw-in projection 8 having a screw-in lead for fixing the cover in the upper part 4'.

Aside from outer projections for an outer bayonet cap guide 5, the lower part 3' exhibits an outer annular groove 38 for the sealing ring depicted on FIG. 3. The lower part 3' has extending into it an upper elastomer membrane 20 and lower elastomer membrane 21, which are joined as a single piece with the lower part 3', and comprise the oil droplet and oil mist protection device 11'. However, the upper elastomer membrane 20 does not cover the entire cross section of the oil fill opening 7, but rather leaves open a passage opening 18, through which oil can be filled into the engine. The lower elastomer membrane 21 also has such a passage opening 19, but it is offset relative to the upper passage opening 18.

This is achieved by virtue of the fact that the upper and lower elastomer membrane 20 and 21 overlap each other, while still being spaced apart by a distance a making it possible for the oil to flow through the upper oil passage opening 18 and over this clearance consisting of a×d, where d is the inner diameter of the lower part 3', toward the lower passage opening 19. This function is explained in greater detail with the next figure. It is here provided that the elastomer tongues 12 and 14 of the oil droplet and oil mist protection device 11' are situated in two planes 16 and 17 one over the other spaced apart from each other by a distance a that largely corresponds to the axial length 1 of the lower part 3'.

Figure 5:
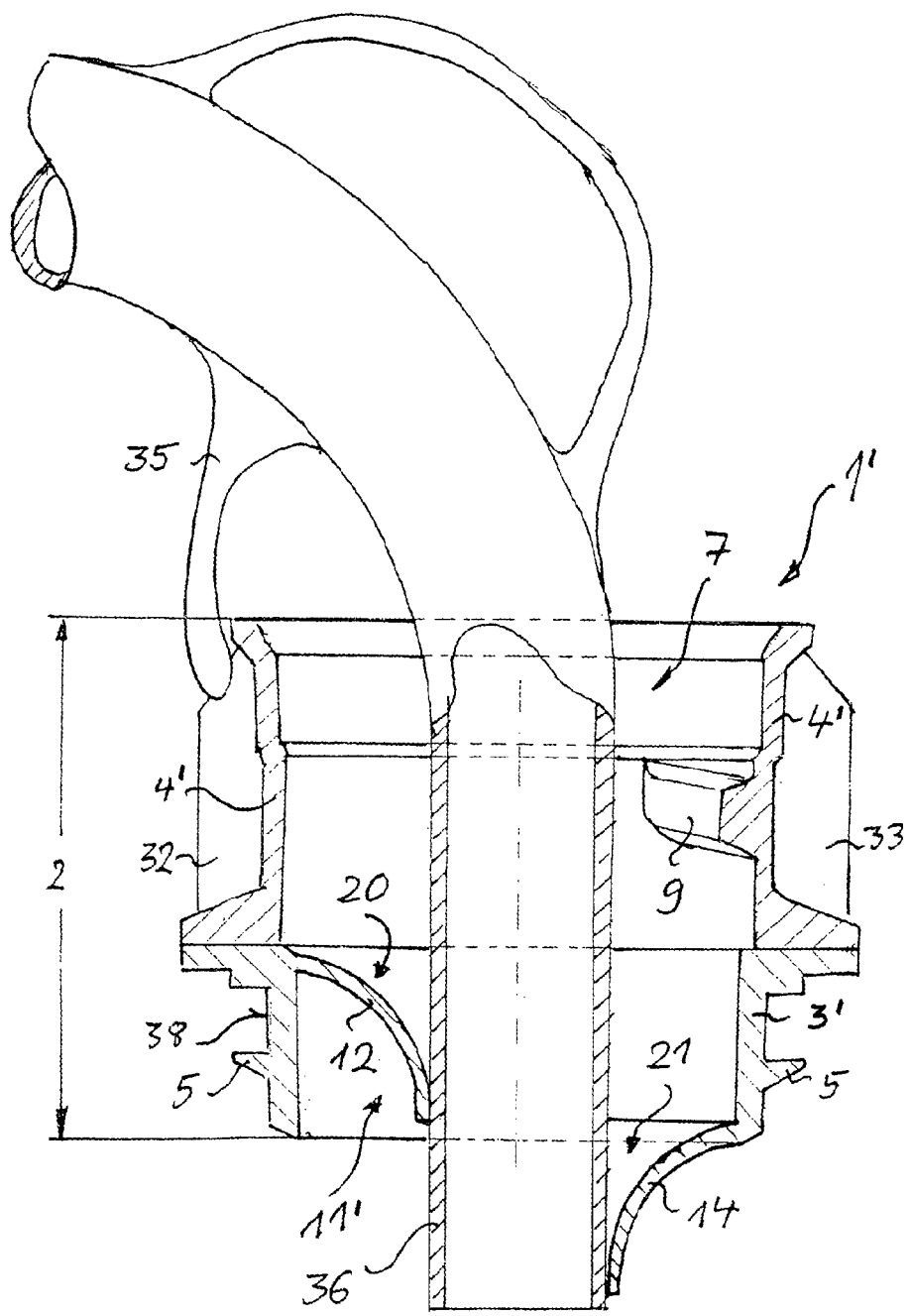
FIG. 5 shows a diagrammatic sketch of the oil filler neck according to FIG. 2 in a cross section, with an inserted oil filling tube of an oil fill tap.

FIG. 5 presents a diagrammatic sketch of the oil filler neck 1' according to FIG. 2 in a cross section, with an inserted oil filling tube 36 of an oil fill tap 35. Such oil fill taps 35 are used to quickly fill engine oil, wherein the oil fill tap causes oil to be pumped out of an oil supply. As FIG. 5 now illustrates, the oil filling tube 36 of the oil fill tap 35 displaces both the upper elastomer tongues 12 and lower elastomer tongues 14 out of their original rest position into a position in which the upper and lower elastomer tongues 12 and 14 tightly abut against the outer periphery of the oil filling tube 36.

Even so, there still remains a labyrinth through which the volume of air displaced with the inflowing oil can exit. However, the oil droplets and oil mist contained in the exiting air here are largely deposited on the lower sides of the elastomer tongues 12 and 14 of the oil droplet and oil mist protection device 11'.

Figure 6:
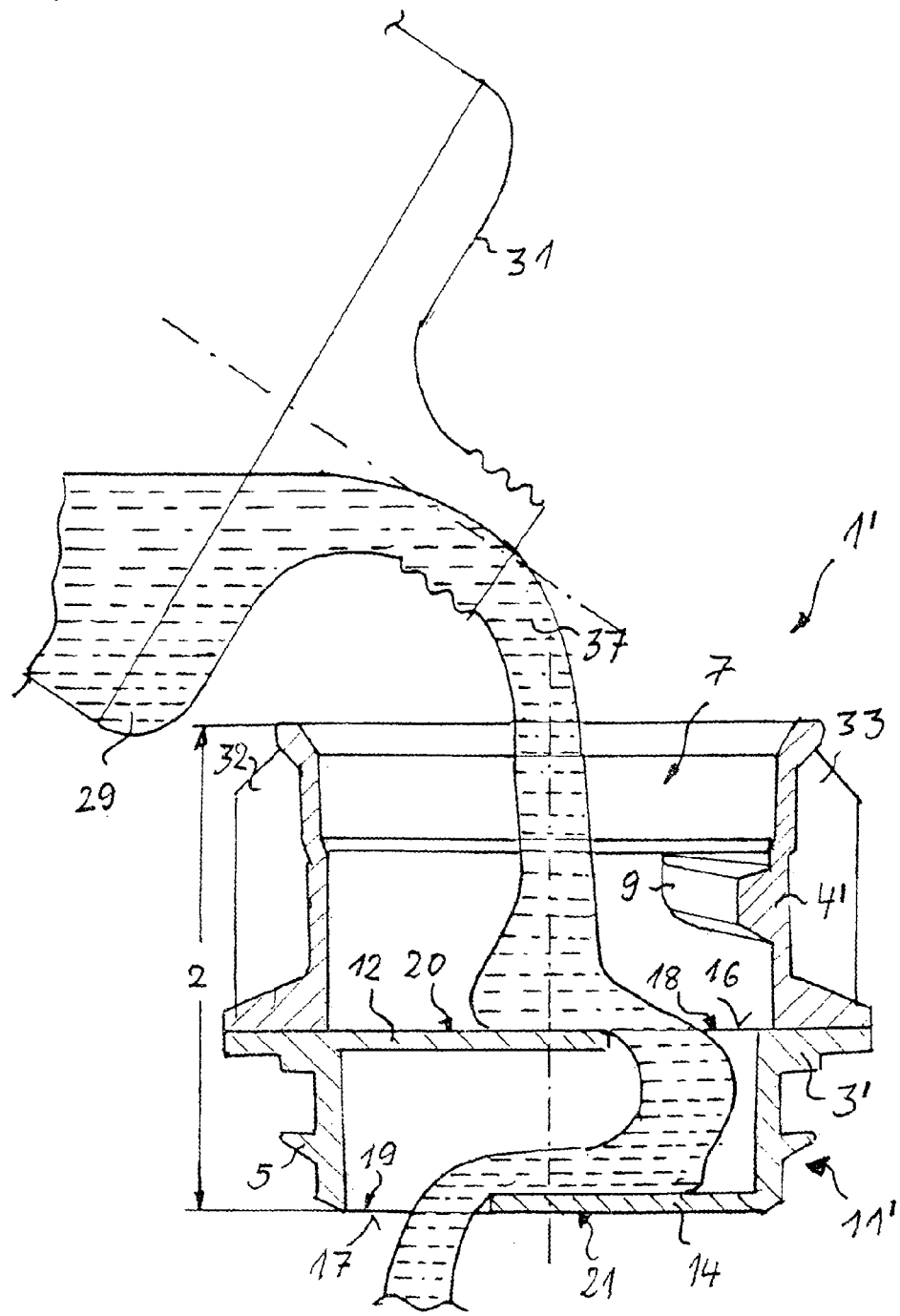
FIG. 6 shows a diagrammatic sketch of the oil filler neck according to FIG. 2 in a cross section, with inflowing oil from an oil container.

FIG. 6 shows a diagrammatic sketch of the oil filler neck 1' according to FIG. 2 in a cross section with inflowing oil 37 from an oil container 31. As it flows out of the oil container 31, the oil 29 stored in the oil container 31 hits the upper elastomer membrane 20 of the oil droplet and oil mist protection device 11' of the lower part 3' of the extension adapter 2, and flows on the upper plane 16 through the upper oil passage opening 18 to the lower elastomer membrane 21, and there again through the oil passage opening 19 in the lower plane 17. As shown on FIG. 4, the oil passage openings 18 and 19 as well as the clearance a×d between the upper and lower elastomer membrane 20 and 21 are here dimensioned in such a way that the displaced volume of air can exit the engine area in a countercurrent, while oil droplets and oil mist in the air streaming out become deposited on the lower sides of the membranes 20 and 21.

Figure 7:
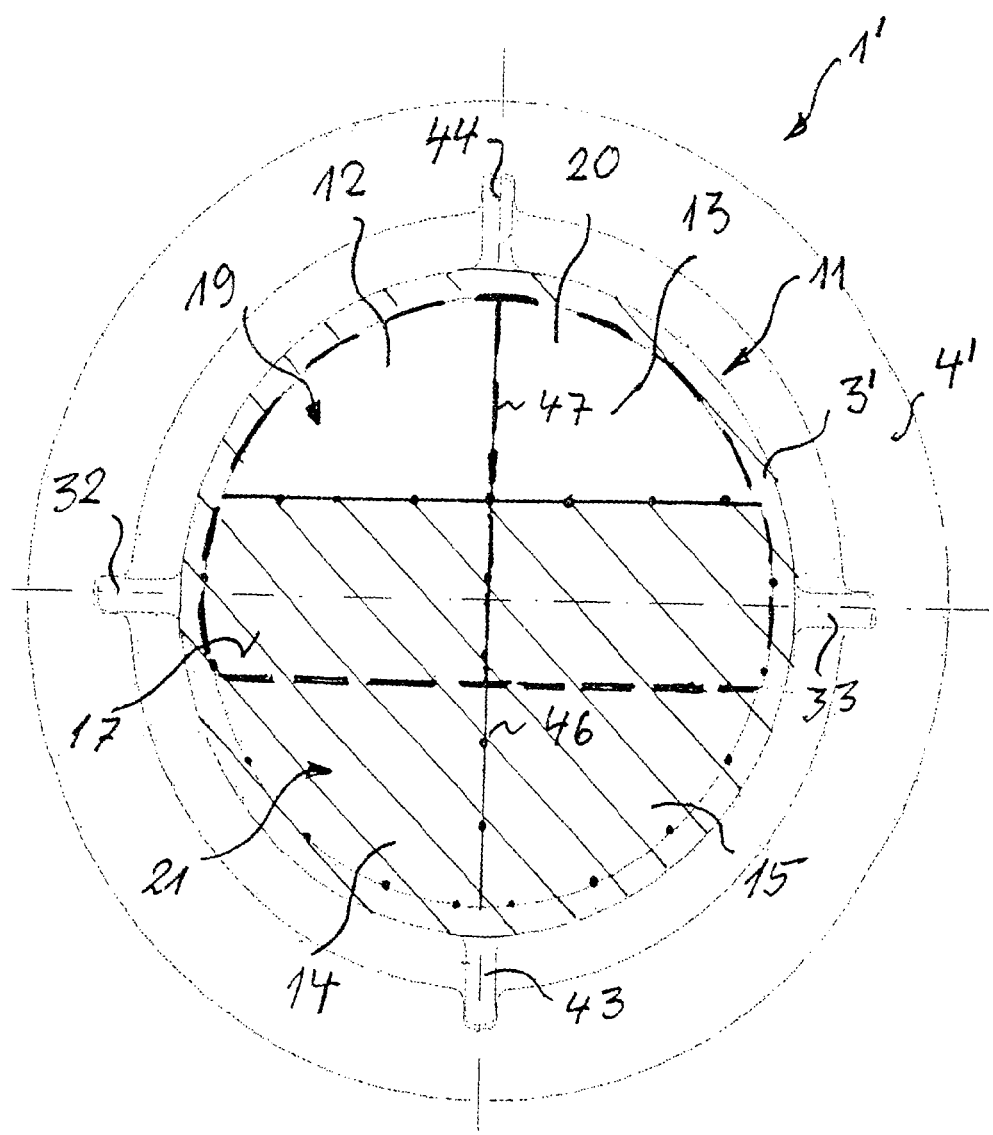
FIG. 7 shows a diagrammatic bottom view of the oil filler neck according to FIG. 2, with crosscut lower elastomer tongues of the oil droplet and oil mist protection device.

FIG. 7 shows a diagrammatic bottom view of the oil filler neck 1' according to FIG. 2 with crosscut lower elastomer tongues 14 and 15 of the oil droplet and oil mist protection device 11'. To this end, the lower elastomer membrane 21 is here provided with a middle split cut 46, thereby giving rise to the two elastomer tongues 14 and 15. The contour of the lower membrane 21 with the split cut 46 is marked with dots. The contour of the upper elastomer membrane 20 with a split cut 47 is marked with dashes, highlighting the overlapping area of both membranes 20 and 21 and the four elastomer tongues 12, 13, 14 and 15. Also discernible is the outline of the lower oil passage opening 19 shaped like a circular segment. Further visible in this bottom view are the reinforcing ribs 32 and 33 as well as 43 and 44 of the upper part 4', which enhance the stiffness of the upper partial part 4 of the extension adapter, and facilitate the insertion of the latter into an oil fill opening of a cylinder head cover.

Figure 8:
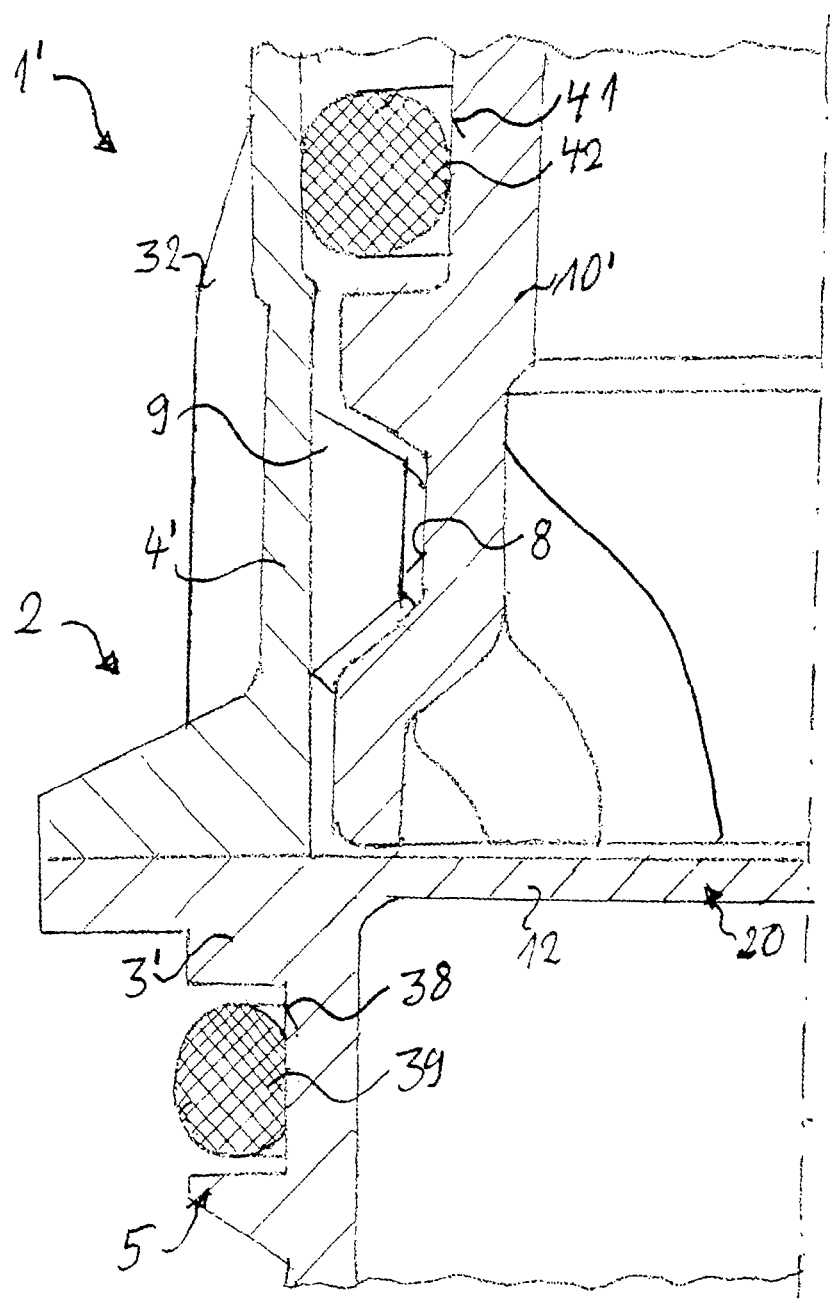
FIG. 8 shows a diagrammatic detail of the oil filler neck with an oil filler sealing cap applied thereto.

FIG. 8 presents a diagrammatic view showing a detail of the oil filler neck 1' according to FIG. 2 with an affixed oil filler sealing cover 10'. This detail once again depicts how the upper membrane 20 with an elastomer tongue 12 of the oil droplet and oil mist protection device 11' is arranged in the lower part 3' of the extension adapter 2. In addition, FIG. 8 shows the two ring seals 39 and 42, which on the one hand seal the extension adapter with the ring seal 39 in the cylinder head cover, and on the other hand seal the oil filler sealing cover 10' media-tight in relation to the extension adapter 2 with the ring seal 42. Also in evidence once again is the structure and function of the screw region 9, with which the oil filler sealing cover 10' engages when screwed into the extension adapter 2 as depicted on FIG. 8.

Figure 9:
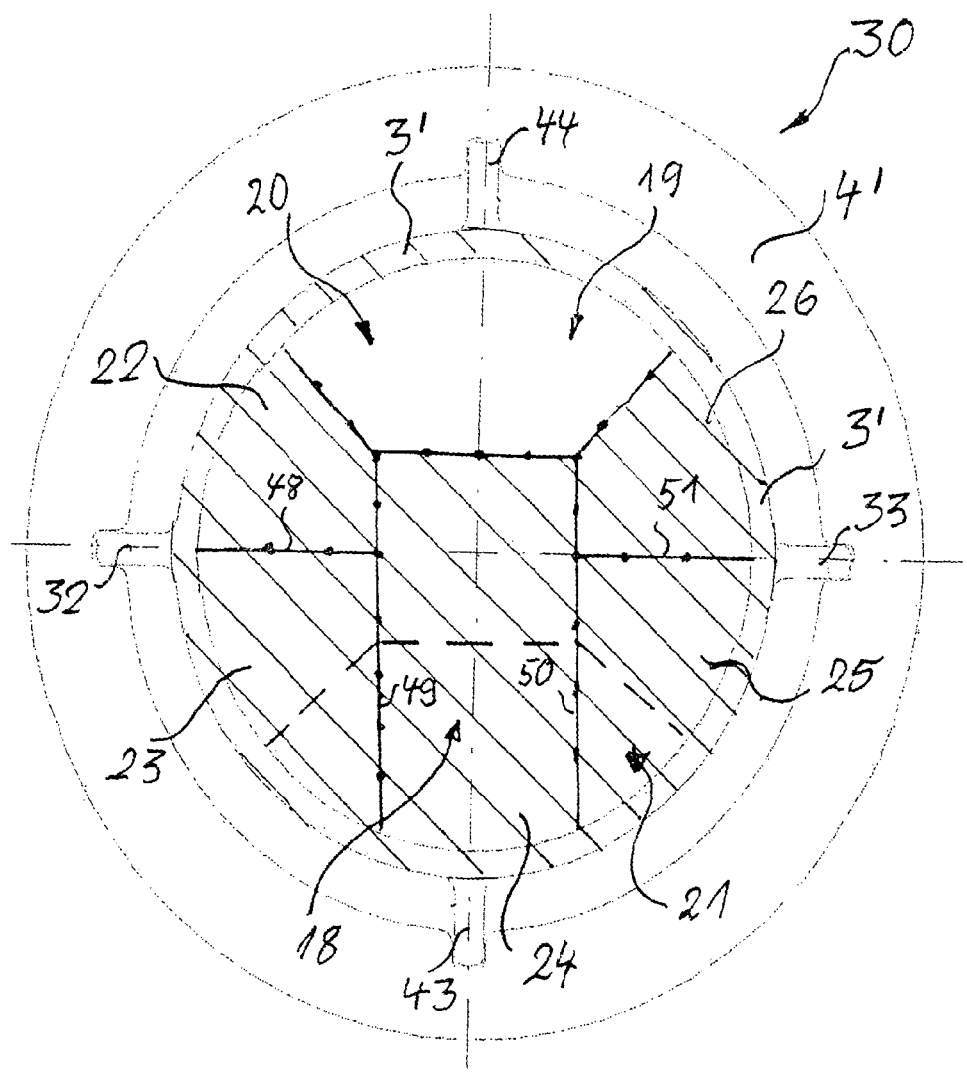
FIG. 9 shows a diagrammatic bottom view of an oil filler neck with crosscut lower elastomer tongues of a second embodiment.

FIG. 9 shows a diagrammatic bottom view of an oil filler neck 30 with cross sectionally depicted lower elastomer tongues 22 to 26 of a second embodiment. As demonstrated by this embodiment, the lower along with the upper elastomer membrane 21 or 20 can be cut open into a plurality of elastomer tongues 22, 23, 24, 25 and 26. To this end, the split cuts 48, 49, 50 and 51 are marked with dots in this representation. In like manner, but offset relative to this lower membrane 21, the upper membrane 20 can also be correspondingly separated. The plurality of resultant elastomer tongues 22 to 26 makes it possible to better tailor the latter, for example to the oil filling tube shown on FIG. 5. While the elastomer tongues can basically be divided up in entirely different ways, care must always be taken that the lower oil passage opening 19 does not come to be situated precisely opposite an upper oil passage opening 18, here denoted with a hatched line.

FIG. 10 shows a diagrammatic cross section through an extension adapter 2 of an oil filler neck 40 according to a third embodiment of the invention. This embodiment of the invention differs from the preceding embodiments in that edge areas 34 of the upper membrane 20 and lower membrane 21 are not manufactured as a single piece with the lower part 3' of the extension adapter 2 as in the preceding embodiments, but rather separately as individual parts.

The edge areas 34 of these elastomer tongues 12 or 14 and/or membranes 20 or 21 are clamped between the upper part 4' and lower part 3' in the case of the upper membrane 20, while the lower elastomer membrane 21 or its elastomer tongues 14 can be clamped between the lower part 3' and an edge area of the oil fill opening. While the mechanical fixation is costlier than fabricating the oil droplet and oil mist protection device 11' as a single piece, the materials of the individual regions can be better tailored to the corresponding function with respect to stiffness and flexibility.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. An oil filler neck for a cylinder head cover, comprising:
    a separate extension adapter, formed by the oil filler neck, having a lower part and an upper part; and
    an oil fill opening with an oil droplet and an oil mist protection device having a lower partial area and an upper partial area,
    the oil droplet and the oil mist protection device having elastomer tongues originating at opposite sides thereof and arranged one over the other in parallel planes and spaced apart from each other in the upper partial area and the lower partial area,
    wherein the lower part of the extension adapter comprises the oil droplet and the oil mist protection device, and the lower part comprises an outer cap guide that is configured to interact with an inner cap guide of the oil fill opening, and
    the upper part comprises an inner screw projection that is configured to interact with an outer screw region of an oil filler sealing cap.

2. The oil filler neck according to claim 1, wherein the elastomer tongues in the upper partial area and the elastomer tongues in the lower area overlap such that an upper oil passage opening and lower oil passage opening are offset relative to each other.

3. The oil filler neck according to claim 1, wherein the elastomer tongues flexibly adjust to an insertion of a filling tube of an oil fill tap.

4. The oil filler neck according to claim 1, wherein the elastomer tongues are arranged in a lower plane and an upper plane one above the other and spaced apart by a distance that corresponds to an axial length of the lower partial area.

5. The oil filler neck according to claim 4,
    wherein the elastomer tongues leave open an oil passage cross section that corresponds to a maximum clearance between the upper plane and the lower plane of the elastomer tongues, and
    wherein the maximum clearance is a×d, where a is equal to the distance between the upper plane and the lower plane and d is equal to an inner diameter of the lower partial area.

6. The oil filler neck according to claim 1,
    wherein the elastomer tongues in the upper partial area form an upper top surface that is smaller than a cross sectional surface of the oil fill opening, and
    wherein the upper top surface leaves open an upper oil passage opening.

7. The oil filler neck according to claim 6,
    wherein the elastomer tongues in the lower partial area form a smaller lower top surface than the cross sectional surface of the oil fill opening, and
    wherein the lower top surface leaves open a lower oil passage opening.

8. The oil filler neck according to claim 6, wherein the elastomer tongues in the upper partial area is formed by an elastomer membrane cut through at least once that covers more than half the cross sectional surface of the oil fill opening.

9. The oil filler neck according to claim 6, wherein the elastomer tongues in the lower partial area is formed by an elastomer membrane cut through at least once that covers more than half the cross sectional surface of the oil fill opening.

10. The oil filler neck according to claim 1,
    wherein the lower part and the elastomer tongues form a one-piece injection molded part comprising two material components, a hard elastomer of the lower part, and a soft elastomer of the elastomer tongues.

11. The oil filler neck according to claim 1,
    wherein outer edges of an upper elastomer membrane of the elastomer tongues are fixed between the upper part and the lower part of the extension adapter, and
    wherein outer edges of a lower elastomer membrane are fixed between the lower part and an edge area of the oil fill opening.

12. The oil filler neck according to claim 1,
    wherein outer edges of an upper elastomer membrane of the elastomer tongues are fixed between the upper part and the lower part of the extension adapter, and wherein outer edges of a lower elastomer tongues are fixed between the lower part and an edge area of the oil fill opening.

13. An oil filler neck for a cylinder head cover, comprising:
a separate extension adapter, formed by the oil filler neck, having a lower part and an upper part; and
an oil fill opening with an oil droplet and an oil mist protection device having a lower partial area and an upper partial area;
the oil droplet and the oil mist protection device having elastomer tongues extending perpendicularly inward from opposite sides of an inner wall of the oil filler neck, the elastomer tongues arranged one over the other in parallel planes and spaced apart from each other in the upper partial area and the lower partial area,
wherein the lower part of the extension adapter comprises the oil droplet and the oil mist protection device and the lower part comprises an outer cap guide that is configured to interact with an inner cap guide of the oil fill opening, and
wherein the upper part comprises an inner screw projection that is configured to interact with an outer screw region of an oil filler sealing cap.

14. The oil filler neck according to claim 13, wherein the elastomer tongues in the upper partial area and the elastomer tongues in the lower area overlap such that an upper oil passage opening and lower oil passage opening are offset relative to each other.

15. The oil filler neck according to claim 13, wherein the elastomer tongues flexibly adjust to an insertion of a filling tube of an oil fill tap.

16. The oil filler neck according to claim 13, wherein the elastomer tongues are arranged in a lower plane and an upper plane one above the other and spaced apart by a distance that corresponds to an axial length of the lower partial area.

17. The oil filler neck according to claim 16,
wherein the elastomer tongues leave open an oil passage cross section that corresponds to a maximum clearance between the upper plane and the lower plane of the elastomer tongues, and
wherein the maximum clearance is a × d, where a is equal to the distance between the upper plane and the lower plane and d is equal to an inner diameter of the lower partial area.

18. The oil filler neck according to claim 13,
wherein the elastomer tongues in the upper partial area form an upper top surface that is smaller than a cross sectional surface of the oil fill opening, and
wherein the upper top surface leaves open an upper oil passage opening.

19. The oil filler neck according to claim 18,
wherein the elastomer tongues in the lower partial area form a smaller lower top surface than the cross sectional surface of the oil fill opening, and
wherein the lower top surface leaves open a lower oil passage opening.

20. The oil filler neck according to claim 18, wherein the elastomer tongues in the upper partial area is formed by an elastomer membrane cut through at least once that covers more than half the cross sectional surface of the oil fill opening.

* * * * *